United States Patent [19]
Dannoux et al.

[11] Patent Number: 5,447,585
[45] Date of Patent: Sep. 5, 1995

[54] METHOD OF MANUFACTURING AND TESTING INTEGRATED OPTICAL COMPONENTS

[75] Inventors: Thierry L. A. Dannoux; Patrick J. P. Herve, both of Avon, France

[73] Assignee: Corning Incorporated, Corning, N.Y.

[21] Appl. No.: 169,057

[22] Filed: Dec. 20, 1993

Related U.S. Application Data

[62] Division of Ser. No. 972,224, Nov. 5, 1992, Pat. No. 5,296,072.

[30] Foreign Application Priority Data

Nov. 25, 1991 [EP] European Pat. Off. ............ 91120030

[51] Int. Cl.$^6$ .............................................. G02B 6/30
[52] U.S. Cl. ..................... 156/64; 156/158; 385/14; 385/49; 385/89
[58] Field of Search .................. 156/158, 64, 296, 153, 156/257, 256, 267; 385/14, 49, 89, 97

[56] References Cited

U.S. PATENT DOCUMENTS

| | | |
|---|---|---|
| 4,329,190 | 5/1982 | Berg et al. ...................... 156/322 X |
| 4,729,618 | 3/1988 | Yoshida et al. . |
| 4,736,198 | 3/1988 | Brown et al. ........................ 385/89 |
| 4,765,702 | 8/1988 | Dohan et al. . |
| 4,772,086 | 9/1988 | Bellerby et al. . |
| 4,933,262 | 6/1990 | Beguin . |
| 4,943,130 | 7/1990 | Dannoux et al. . |
| 4,979,970 | 12/1990 | Dannoux et al. . |
| 5,080,458 | 1/1992 | Hockaday . |
| 5,091,989 | 2/1992 | Dannoux . |
| 5,113,460 | 5/1992 | Hakoun et al. . |
| 5,123,068 | 6/1992 | Hakoun et al. . |
| 5,175,781 | 12/1992 | Hockaday et al. . |
| 5,179,609 | 1/1993 | Blonder et al. ........................ 385/89 |
| 5,185,835 | 2/1993 | Vial et al. . |
| 5,231,683 | 7/1993 | Hockaday et al. . |

FOREIGN PATENT DOCUMENTS

| | | |
|---|---|---|
| 0283203 | 9/1988 | European Pat. Off. . |
| 0283301 | 9/1988 | European Pat. Off. . |
| 0388642 | 9/1990 | European Pat. Off. . |
| 0422445 | 4/1991 | European Pat. Off. . |
| 0456026 | 11/1991 | European Pat. Off. . |
| 2611923 | 9/1988 | France .................................. 355/97 |
| 57-90984 | 6/1982 | Japan . |
| 57-143890 | 9/1982 | Japan . |

OTHER PUBLICATIONS

Patent Abstracts of Japan, vol. 6, No. 173 (E-129)[1051], Sep. 7, 1982 (Japan 57-90984).
Patent Abstracts of Japan, vol. 6, No. 243 (E-145)[1121], Dec. 2, 1982 (Japan 57-143890).
Bellerby et al, "Low Cost Silica-On-Silicon Single Mode 1:16 Optical Power Splitter for 1550nm", E-FOC 90, STC Technology Ltd., 1990.

*Primary Examiner*—Jeff H. Aftergut
*Attorney, Agent, or Firm*—W. J. Simmons

[57] ABSTRACT

A method of manufacturing and testing integrated optical composites in which fiber pigtails are aligned with and attached to the optical output ports of a plurality of integrated optical components on a wafer, prior to separation into individual components. The multiple pigtails are arranged at the ends opposite the wafer, to facilitate optical connections during active alignment and measurement testing.

5 Claims, 6 Drawing Sheets

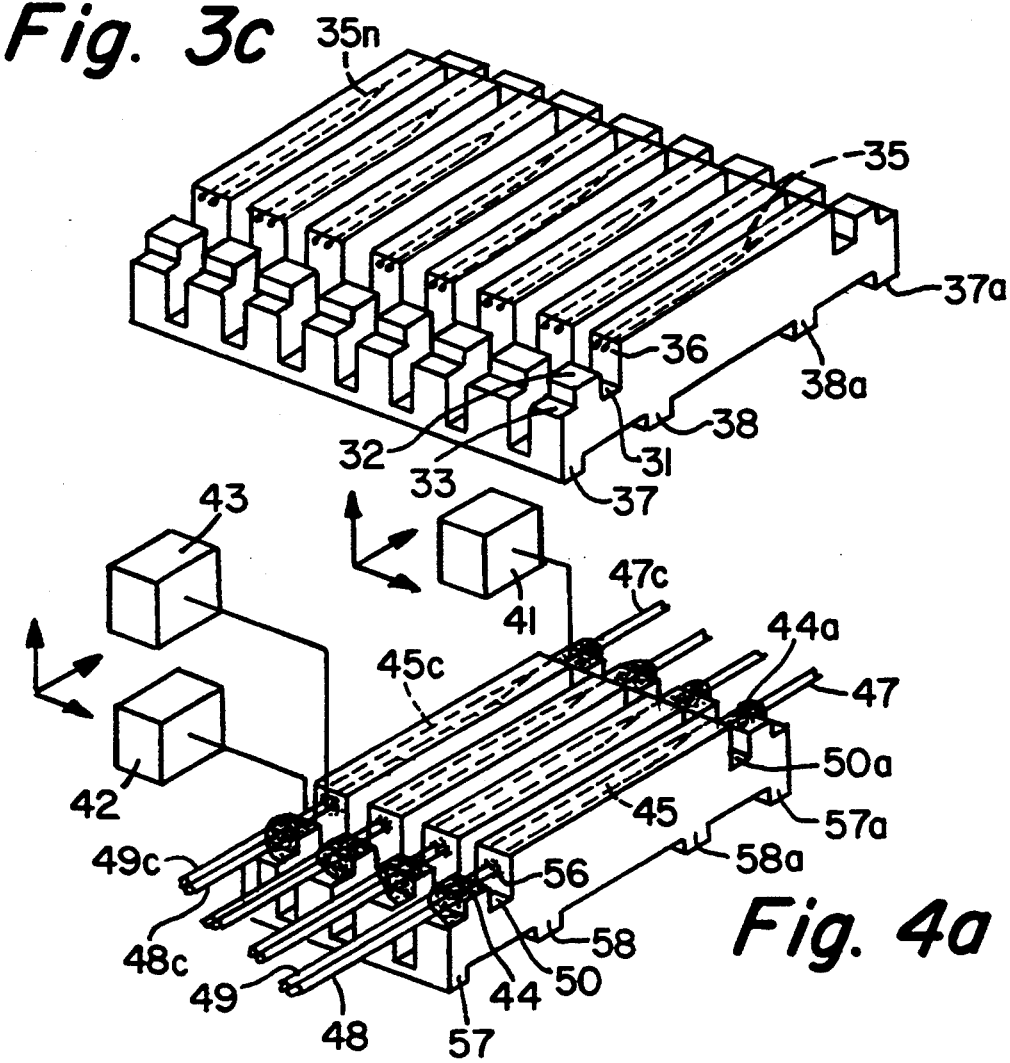
Fig. 3c
Fig. 4a
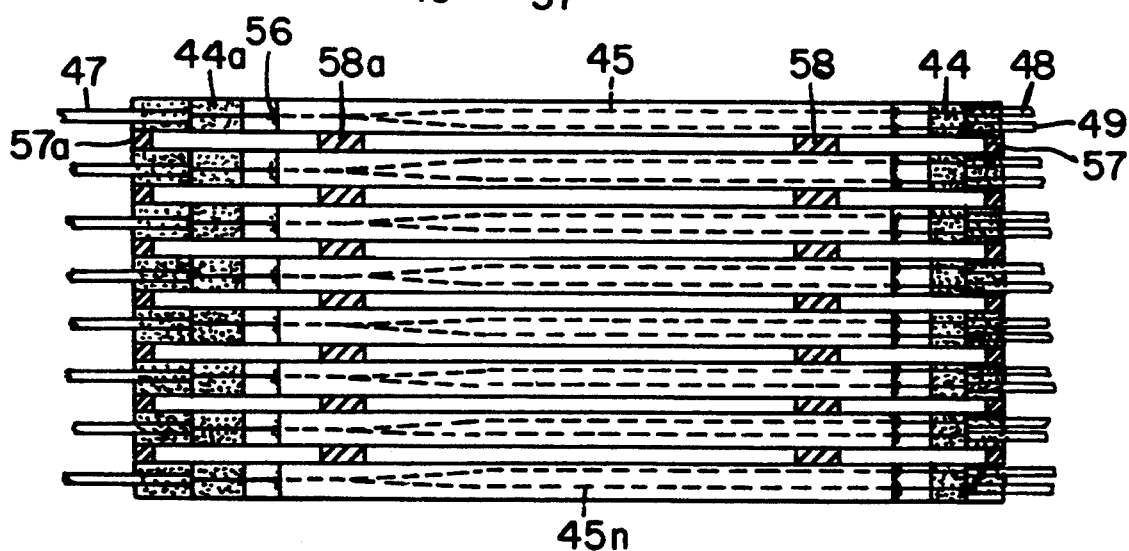
Fig. 4b

METHOD OF MANUFACTURING AND TESTING INTEGRATED OPTICAL COMPONENTS

This is a division of application Ser. No. 07/972,224, filed Nov. 5, 1992, now U.S. Pat. No. 5,296,072.

BACKGROUND OF THE INVENTION

The present invention relates to a method of manufacturing integrated optical devices and testing their performance. The invention is particularly concerned with the manufacture and testing of integrated optical components which have optical fiber pigtails.

Integrated optical components with fiber pigtails are well known. See, Dohan et al. U.S. Pat. No. 4,765,702, Beguin U.S. Pat. No. 4,933,262 and Dannoux et al. U.S. Pat. No. 4,943,130. These components have been produced using ion exchange techniques. Dannoux et al. U.S. Pat. No. 4,979,970 is directed to a method of manufacturing an integrated optical component comprising, for example, a 2×2 optical waveguide proximity coupler, each end of the coupler having two optical fibers (pigtails) attached in optical alignment with two ion-diffused waveguides within a glass substrate. FIGS. 2a and 2b of the present application depict a prior art 1×2 splitter/combiner of a similar structure.

Pigtailing is a critical step in the manufacture of such integrated optical components. This step includes both the alignment of the optical fiber waveguide paths with the ion-diffused waveguide paths, and the attachment of the fiber pigtail ends to the component surface. The alignment must be very precise, and the attachment must assure the stability of the alignment during environmental variations (especially temperature fluctuations). Precise alignment is difficult, especially for single mode waveguides, whose core diameters are in the range of 5–10 microns.

As described in Dannoux et al. U.S. Pat. No. 4,979,970, the fiber pigtail ends may be precisely aligned with the optical circuit paths using a micromanipulator, after initial approximate alignment by means of an external jig referenced to the component body (col. 4, lines 20–24 and 41–50). The micromanipulator is typically used in conjunction with optical detection means to provide active alignment—the micromanipulator moves the fiber end back and forth in the vicinity of the component waveguide output port, until the detected optical signal is at a maximum. The precision of the micromanipulator movements is on the order of a tenth of a micron.

Once precise alignment is achieved by means of a micromanipulator, a glue joint is applied to the junction of the fiber and the component surface, and the glue is hardened (for example, by ultraviolet light curing) to attach the fiber pigtail to the component.

Referring to FIGS. 2a and 2b, optical component 30 includes waveguide combiner/splitter 25 separated by transverse exit groove 21 from bare fiber attachment support 22 and coated fiber attachment support 23. Transverse exit groove 21 forms alignment space 20, which provides room for the micromanipulator to hold and move the optical fibers. To carry out active alignment, two micromanipulators may be used simultaneously to align input fiber 27 and first output fiber 28. Once fiber 27 and 28 are thus aligned, their precise alignment is maintained by glue joints 26 and 26a, and the fibers are securely attached to the component by adhesive means 24 and 24a. The operation is repeated for fiber 29. For a 1×2 device all three fibers may be aligned and attached simultaneously, depending on the sophistication of the micromanipulators and of the software driving them.

In prior art techniques (see FIGS. 1a–1c), the waveguide paths for numerous components are created simultaneously in a single wafer 5 by photolithographic techniques. Thereafter, the components are grooved (FIG. 1b) and separated (FIG. 1c), and all further operations, such as pigtailing and packaging (assembly), measurement, characterization and testing are performed separately on the individual components.

In the prior art fiber pigtailing process described above there are two separate alignment steps for each passive optical component: 1) initial approximate alignment (on the order of ±20 microns); and 2) precision alignment (on the order of ±0.5 micron). This is a costly and time-consuming drawback. The initial approximate alignment requires the most time, as the side surface of the component is often a poor reference point. Once the waveguide output port for one of the fibers on the multi-fiber side of a single device has been precisely located, the other output port or ports on this side of this device can be located without repeating the approximate alignment step. This is because the waveguide paths are very precisely aligned with one another in the photolithographic masking stages of the process (better than 1 micron precision). However, the time-consuming approximate alignment step must be repeated for each new device.

FIGS. 1a, 1b and 1c depict the individual component formation process of the prior art. FIG. 1a depicts an integrated optics wafer 5 in which the waveguide paths have been formed (paths are not shown) for tens to hundreds of individual components. FIG. 1b depicts a wafer after fiber attachment supports 2/3 and 2a/3a and transverse exit grooves 1 and 1a have been formed in the wafer, typically by grinding and typically after the waveguide paths have been formed in the wafer. The wafer is thereafter separated into individual components 10 by conventional methods.

Within a single wafer, there is precise alignment between the waveguide paths of different components, due to the inherent precision of the photolithographic process. However, when the wafer is separated into individual components, this precise alignment is destroyed. It is therefore an object of the present invention to preserve the precise alignment of the initial photolithographic process until the fiber pigtails are securely attached to the integrated optical components.

Other steps in prior art manufacturing processes are also costly and time consuming when carried out separately for each individual component. For example, preparation and handling of individual optical fibers for attachment to numerous individual devices requires numerous separate repetitive operations, such as stripping and fiber end face preparation (reduction of back reflections). This is especially true in the alignment and measurement stages of the manufacturing process, where the fiber ends opposite the component must be separately located in order to inject or detect an optical signal. It is therefore another object of the present invention to perform the manufacturing operations of assembly, packaging and measurement on a large number of components at a time, rather than separately on individual components, obviating the necessity of creating a separate optical location and connection with the free end of each fiber pigtail.

In addition, separate handling of individual components in the early stages of the manufacturing process is also time-consuming and costly. It is therefore an object of the present invention to maintain the compact integrity of the integrated optics wafer as long as possible in the manufacture and testing of integrated optical components.

SUMMARY OF THE INVENTION

In accordance with one aspect of the present invention, the precise separation of the waveguide paths of different components within the integrated optics wafer is maintained during fiber pigtail alignment and attachment, and thereafter the wafer is separated into individual components.

In accordance with another aspect of the present invention, the integrity of the integrated optics wafer and/or the mass pigtailing means is maintained through various degrees of mass manufacturing, including mass pigtail assembly and/or mass packaging and/or mass measurement.

Another aspect of the present invention relates to a method of manufacturing integrated optical devices having optical fiber pigtail means attached to optical output ports comprising the steps of: a) forming a multiple unit structure comprising a plurality of optical device components, each of said optical device components having at least one optical output port; b) attaching at least one optical fiber pigtail means in optical communication with at least one optical output port on each of a plurality of said optical device components, while said plurality of optical device components are integrally connected; and, c) separating said multiple unit structure into a plurality of individual optical device components, said individual optical device components having attached optical fiber pigtail means.

Another aspect of the present invention relates to a method of manufacturing integrated optical components having optical fiber pigtail means attached to optical output ports comprising the steps of: a) combining a plurality of optical fibers into a ribbon structure; b) maintaining the fiber end surfaces at a first end of the ribbon in a fixed relation to each other; and, c) actively aligning the fiber end portions at the second end of the ribbon with the waveguide output ports of a plurality of integrated optical components, while maintaining said fiber end surfaces at said first end of said ribbon in a fixed relation to each other to facilitate injection and detection of light signals during said active alignment.

BRIEF DESCRIPTION OF THE DRAWINGS

FIGS. 3a–3c are end, side and perspective views of an integrated optics wafer during one stage of the present invention with the multiple optical components pre-diced but not fully separated.

FIG. 4a is a perspective view of the pre-diced wafer during the fiber attachment stage of the present invention.

FIG. 4b is a top view of the pre-diced wafer after fiber attachment.

DETAILED DESCRIPTION

Figure 1A:
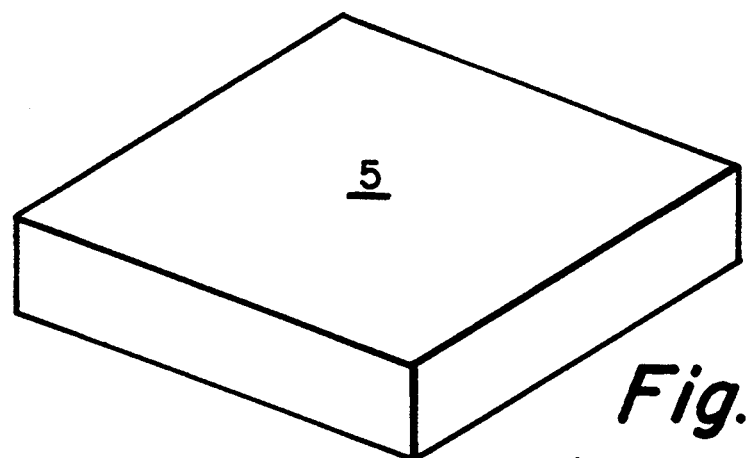
FIGS. 1a–1c are perspective views of a prior art integrated optics wafer with multiple optical elements, showing the wafer after squaring off (1a), after the transverse exit groove and fiber supports have been machined (1b), and after the wafer has been separated into individual optical components (1c).
Figure 1B:
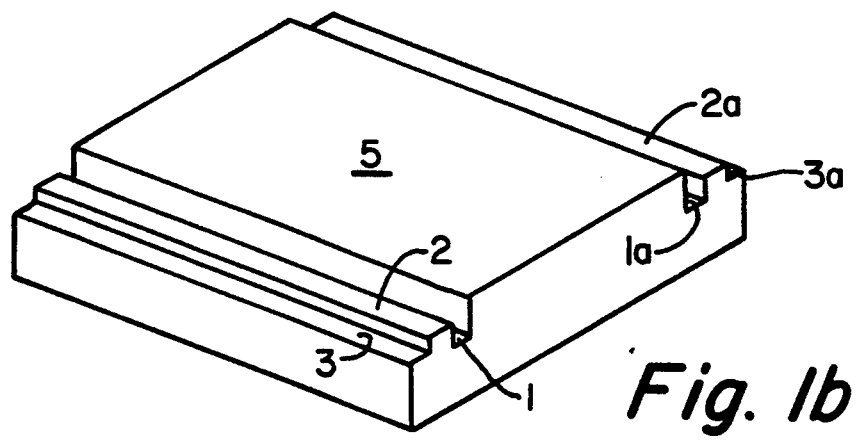
Figure 1C:
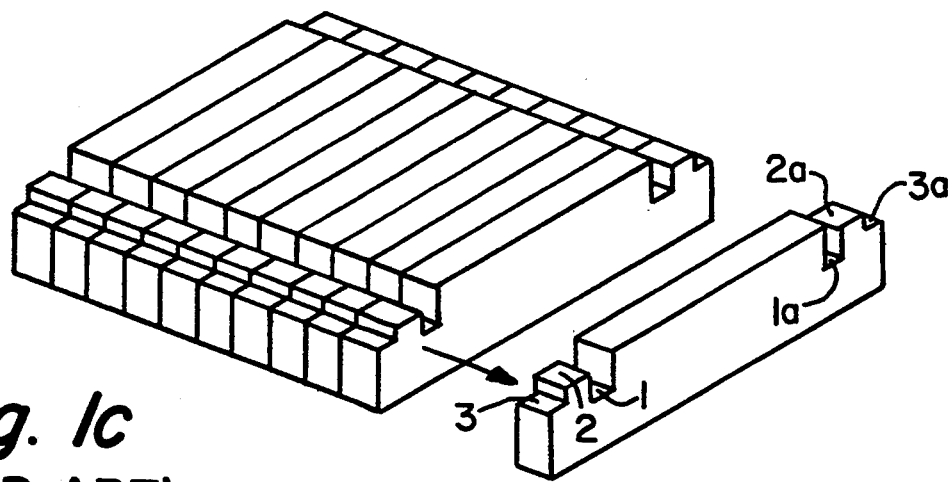
Figure 2A:
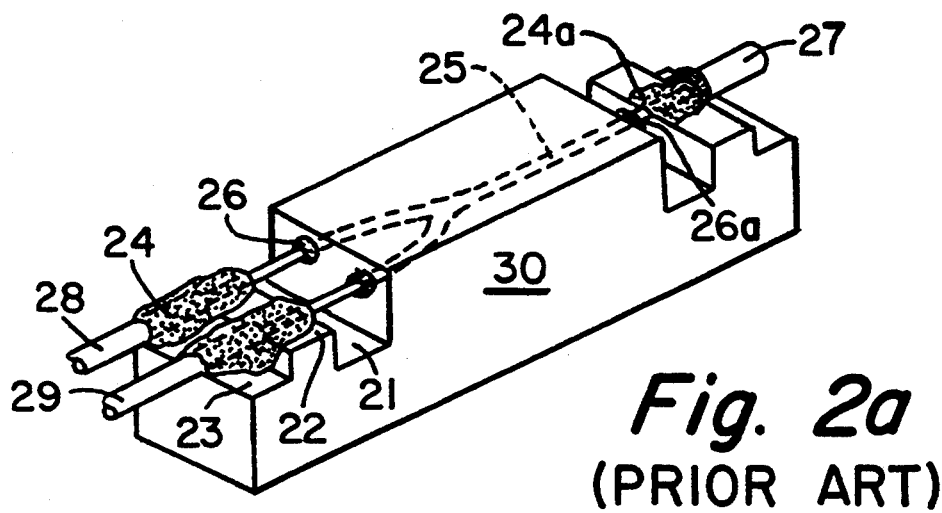
FIGS. 2a and 2b are perspective and side views of a prior art integrated optical component after fiber attachment.
Figure 2B:
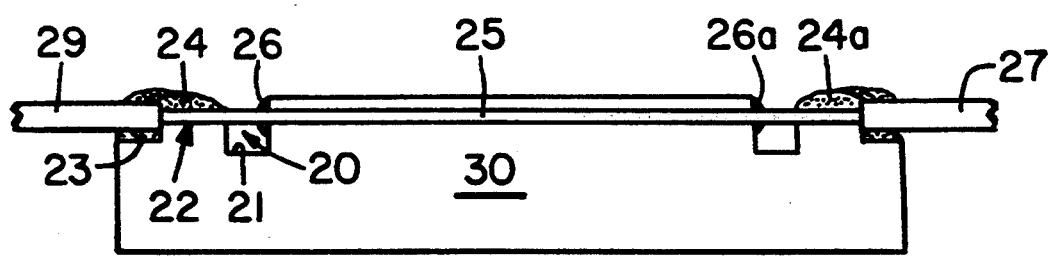
Figure 3A:
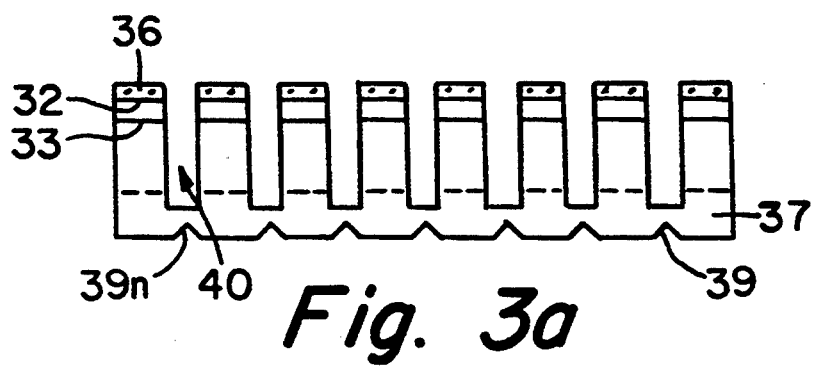
Figure 3B:
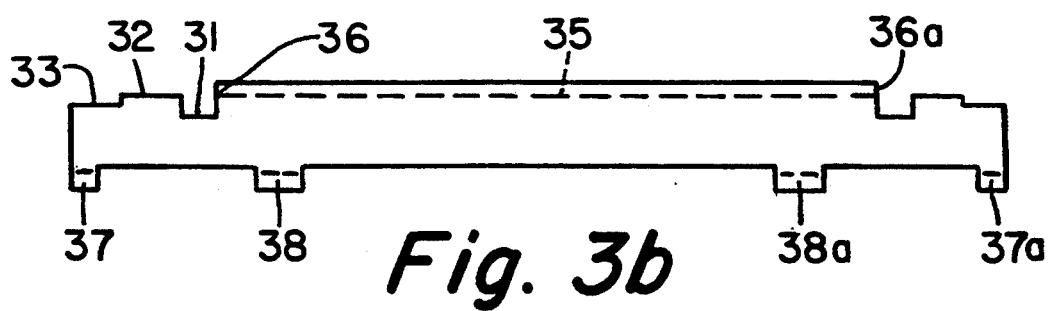

The integrated optics wafer of FIGS. 3a, 3b and 3c, with waveguide paths 35–35n has been prepared for fiber pigtail attachment, by the formation of fiber attachment supports 32/33 and the exposing of output ports 36 and 36a by the formation of transverse exit groove 31. Although in a typical device, some of the ports are output ports (e.g., on one side) and other ports are input ports (e.g., on the other side) for the sake of simplicity, optical output ports as used herein may also include optical input ports. The wafer has been partially pre-diced to form intercomponent gaps 40, but the components remain connected by cross-connect segments 37 and 38 and 37a and 38a. Pre-dicing may be carried out using conventional vibrating wire cutting, by stopping the operation before the dicing wire passes completely through the wafer. Other dicing means such as a multi-wire (vibrating) cutter or a multi-blade saw may also be used.

In the embodiment of the invention that is depicted in FIGS. 3a–3c, portions of the bottom layer of the wafer have been removed, making the cross-connect segments relatively thin, in order to facilitate later separation. In addition, the cross-connect segments or other integral connections may be scored or scribed with a diamond scoring means to facilitate form scoremarks 39–39n which facilitate ultimate separation after fiber pigtailing and/or further packaging.

The interior cross-connect segments 38 and 38a are preferably not located directly under transverse exit groove 31, which presents the thinnest region of the wafer. When the individual components are snapped apart or sawed micro-cracks may appear in the wafer, and it is preferable to prevent the formation of micro-cracks directly under the thinnest region of the wafer.

Relatively thin cross-connect segments facilitate separation, and they allow free spaces between the components for the injection of the packaging glue prior to separation when a composite foil is used to provide U-clip packaging (see FIG. 4c and the related discussion below).

Other integrated connection means may be used in alternative embodiments of the present invention. For example, cross-connect strips, similar to the cross-connect segments, may be securely attached to the wafer prior to the pre-dicing step using suitable adhesive or other attachment means. In this embodiment, the dicing step may cut completely through the wafer, so that the individual components may be separated by removing the adhesive means, using heat, in the case of a wax, or a solvent, in the case of a epoxy. The cross connect strips are preferably wider than the cross connect segments.

In yet another embodiment of the present invention, the pre-dicing may be carried out from the side of the wafer opposite the waveguide paths (rather than from the waveguide side as depicted in FIGS. 3a and 3c). To separate the wafer into individual components, the wafer top is scored between the components, and the components are snapped apart. This embodiment allows for a greater packing density of components on the wafer, as a relatively thick pre-dicing cut is not necessary between the waveguide paths. The cuts on the wafer underside may be under one or more of the waveguide paths. The components in this embodiment are typically T-shaped with the waveguides in the cross-bar (top) of the "T". For an 0.8 mm thick 1×2 device the cross-bar of the "T" is about 0.8 mm thick, while the vertical bar may be only 0.5 mm thick. Packaging is typically carried out after separation.

The wafer of FIGS. 3a-3c depicts eight 1x2 components, although a typical wafer would include forty (40)-eighty-five (85) or more 1×2 components. In FIG. 4a, a portion of the wafer of FIGS. 3a-3c is shown during the pigtail alignment and attachment stage. Fiber pigtail alignment and attachment may be carried out in succession for the fibers on each side of the integrally connected components, using techniques similar to those described in Dannoux et al. U.S. Pat. No. 4,979,970, which is incorporated herein by reference. In FIG. 4a, alignment and attachment has been carried out for the first three components, and the process is underway for the fourth component.

In a preferred embodiment of the present invention, the fibers are aligned for a first component by micromanipulation means 41, 42 and 43, using a first approximate alignment and a second precise alignment, carried out within transverse exit grooves 50 and 50a. As depicted in FIG. 4a, the three micromanipulators means 41, 42 and 43 operate together to actively align input fiber 47a and output fibers 48n and 49n. First, fibers 47n and 49n are aligned and attached, and thereafter or simultaneously, fiber 48n is aligned and attached. The micromanipulation means include angled comb means (multiple V-grooves) or finger means (pliers) for positioning the fibers within the transverse exit grooves. The fibers may be bent to provide a secure contact with the positioning means. In the attachment stage, UV sensitive glue joint 56 and adhesive means 44 are applied and cured by ultraviolet light.

Once the first component has been aligned and attached, the position of the waveguide output ports is stored, and the micromanipulation means steps to the next component using these stored positions as reference locations. These positions are compared to the known separation distances which have been established by the photolithographic mask. Thus, the time-consuming and costly first approximate alignment stage is no longer necessary for any component after the first.

In an alternative embodiment of the present invention (not shown), a multiple fiber micromanipulation means may be used to attach multiple fibers to multiple components simultaneously, depending on the sophistication of the micromanipulation means and the required precision of alignment.

After the UV curing has been completed for fiber pigtails of all the components, a thermal curing stage is preferably carried out, to improve the mechanical characteristics of the glue, and to improve the glue/wafer interface.

FIG. 4b is a top view of the pre-diced wafer after the fiber pigtails have been aligned and attached, ready for further packaging.

Figure 4C:
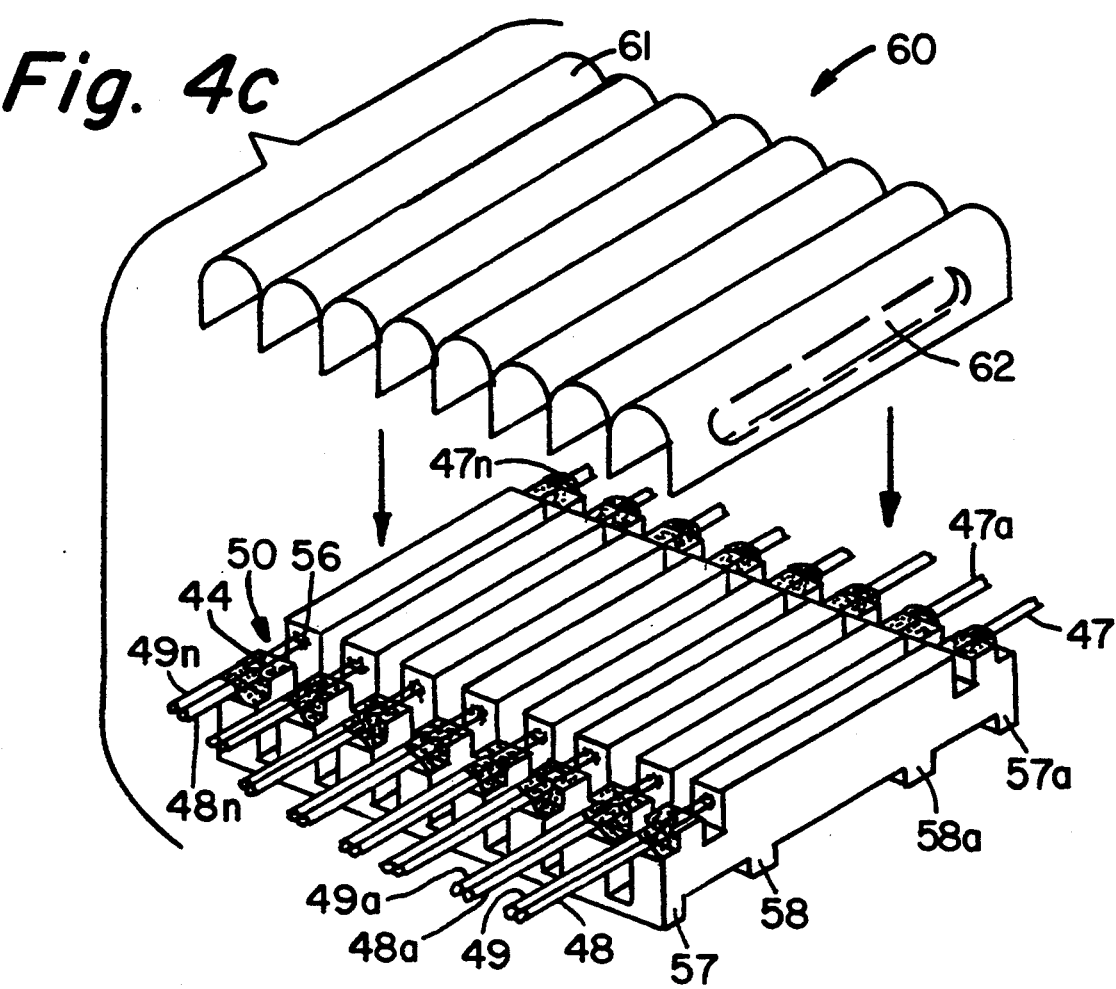
FIG. 4c is a perspective view of the pre-diced wafer with fibers attached, showing the attachment of multiple U-shaped metal foil packaging units.

FIG. 4c is a perspective view of a single packaging step for the multiple connected components, using a composite foil 60 comprising a set of U-clip packaging elements 61. U-clips 61 cover the individual components and form the outer surface of a sealed package. These U-clip packaging elements are further described in Dannoux U.S. patent application Ser. No. 07/593,903, now U.S. Pat. No. 5,091,989, which is assigned to the assignee of the present invention and is incorporated herein by reference. U-clip indents 62 assist in the protection of the fiber/substrate junction from interference due to packaging sealant.

Once composite foil 60 has been inserted over the pre-diced wafer, the individual components may be sealed using a sealant injection method for one or more components at a time, or a dip sealing process for the entire wafer. For cross-connect segments or cross-connect strips which only partially cover the underside of the wafer, open spaces are exposed between the cross-connect to allow application of the sealant from underneath the wafer. In the sealant injection method, a multi-head injection device (e.g., a robot) may be used to direct the sealant through particular openings. For dip sealing, the wafer may be partially lowered into a sealant bath, with sealant entering the U-clip coverings by a wicking action.

Figure 5A:
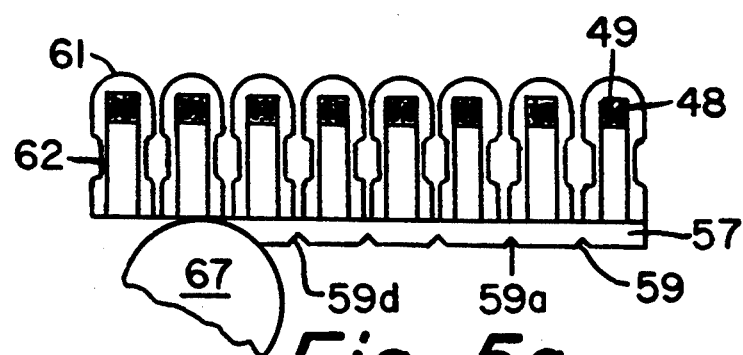
FIGS. 5a and 5b are end views of the wafer showing packaged optical components during and immediately after separation.
Figure 5B:
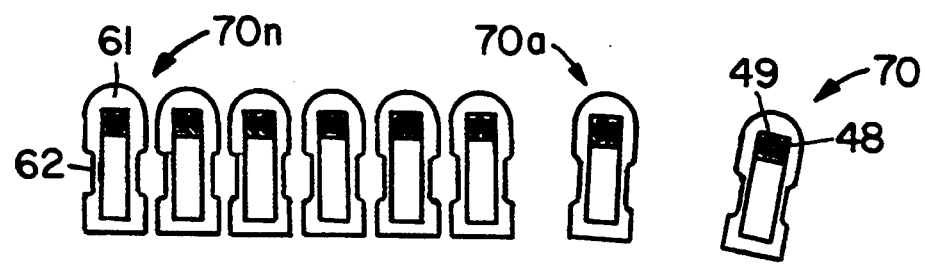

At this point, the integrally connected components are ready for separation. FIGS. 5a and 5b depict a sawing operation whereby cross-connect segments 57, 58, 57a and 58a are removed, leaving the individual pigtailed components 70–70n (with coated fibers 47/48/49–47n/48n/49n) ready for further packaging, measurement, characterization and testing. Alternatively, score marks 59–59n may be used to facilitate snapping off the individual pigtailed components without sawing.

Individual U-clip packaging elements may be utilized alternatively, after the individual components have been separated.

Figure 6:
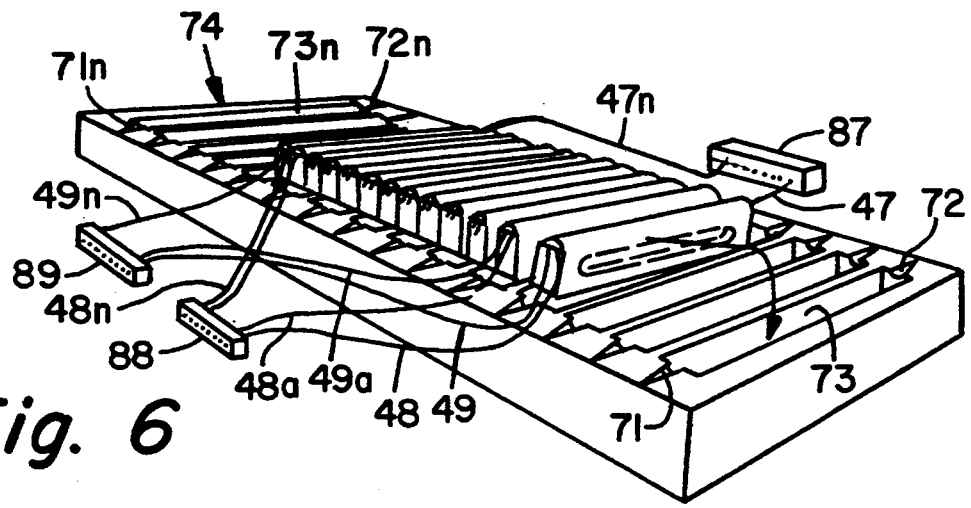
FIG. 6 is a perspective view of a plurality of packaged 1×2 optical components during a further packaging stage utilizing a multi-cavity mold.

FIG. 6 depicts a further packaging step wherein the individual components are encapsulated using injection molding techniques. Multi-cavity mold 74, including injection cavities 73–73n may be used in conjunction with a mated upper mold (not shown) using standard injection molding techniques. Boot molds 71–71n and 72–72n may be used to create boots 81 and 81a (see FIG. 7), to protect the component against fiber disattachment due to pigtail bending.

Some of this additional packaging, for example the creation of boots 81 and 81a (see FIG. 7) may be carried out prior to the separation stage depicted in FIGS. 5a and 5b.

Figure 7:
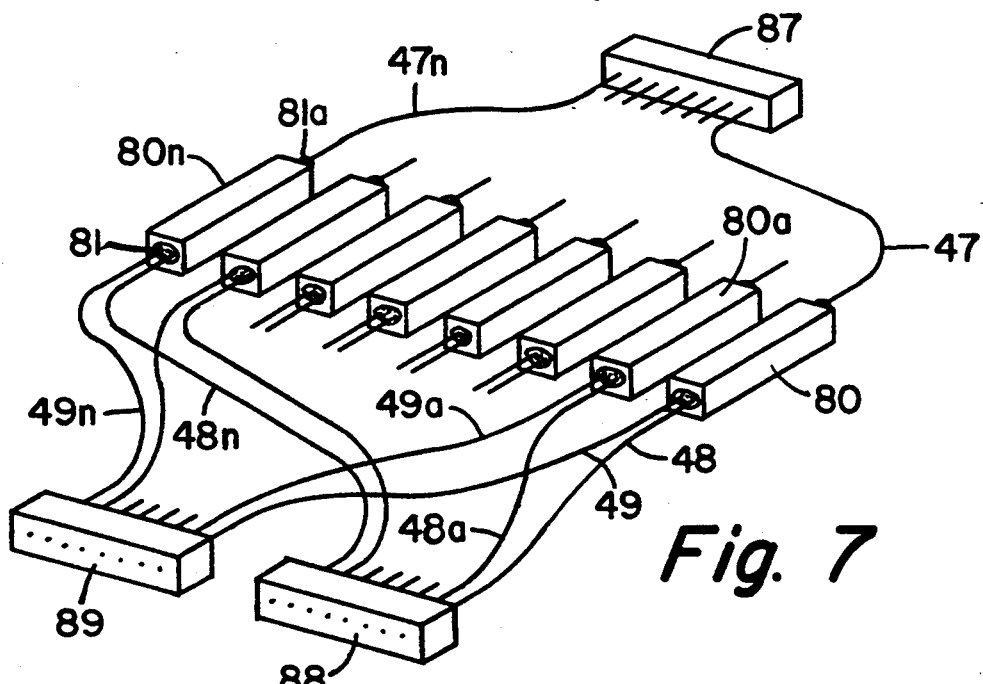
FIG. 7 is a perspective view of a plurality of packaged 1×2 optical components ready for thermal and/or optical testing.

FIGS. 6 and 7 depict another aspect of the present invention, wherein the pigtail fiber ends opposite the component substrates are held together to facilitate mass pigtailing and mass packaging and later measurement, characterization and testing of multiple components. In a preferred embodiment of the invention, array means 87 is used to fix in place the ends of input fibers 47–47n. The fiber ends are precisely separated to facilitate core location and light injection that is required during measurement, characterization and testing. Once the fiber ends are secured by array means 87, the fibers held together in the form of a ribbon. This ribbon of fibers facilitates the alignment and attachment of individual fibers to the pre-diced wafer as depicted in FIG. 4a.

In addition, the ribbon of fibers facilitates mass fiber preparation, including cleaving, stripping of the coating, and end preparation to reduce back reflection, for example by means of an HF acid etch.

The ribbon of fibers may be formed by conventional means, such as winding a single fiber around a reel. For pigtails 1.0 m in length, a reel having a 0.5 m diameter may be used, giving about 0.5 m of extra fiber. The wound fibers may be clamped in place and cleaved, forming a ribbon of fibers, each having a length equal to the circumference of the reel. The clamped ribbon of fibers may thereafter be secured by fixing the fiber ends at one end of the ribbon, for example by use of array means 87. Any suitable ribbon means may be used which allows for separation into individual fibers at some point toward the end of the manufacturing process. Loose tube jacketing means may also be used to protect the fibers in the ribbon, where cabled and/or connectorized pigtails are desired.

Output fiber bundling means 88 and 89 are also used to form ribbons or other bundles for the output fibers 48–48n and 49–49n, respectively. Once the two output fiber bundles have been formed, the fibers from the two bundles may be interleaved, so that all the first output fibers (48–48n) terminate in first output fiber bundling means 88, and all the second output fibers (49–49n) terminate in fiber bundling means 89. Interleaving may be accomplished by flattening the two fiber bundles into ribbons and positioning the ribbon attached to bundling means 89 above the ribbon attached to bundling means 88, with the top ribbon laterally offset from the bottom ribbon so that fiber 49 is positioned above the space between fiber 48 and 48a. Interleaving results when the two ribbons are merged, by suitable tooling or other means.

It is not absolutely necessary for the ends of output fibers 48–48n and 49–49n to be precisely separated during active alignment and during measurement, characterization and testing. This is because a large detector may be used to measure the light output from each complete bundle as the input light is precisely injected into fibers 47–47n with the aid of array means 87. When the light is injected into a single input fiber, e.g., 47, an output is generated through the two output fibers, e.g., 48 and 49, in 1×2 component 80. The two large detectors may be used to cover the end-faces of all fibers in the two fiber bundles, so that they accurately detect the light output of the two separate fibers that are receiving the light split from input fiber 47.

For active pigtail alignment on a wafer of 1×2 devices, a single moving multimode fiber may be used to inject light into the input fibers in succession, and one or two moving multimode fibers may be used to transmit light between individual output fibers and one or two detectors. In such a case, the ends of output fibers must be separated with some degree of precision. Similarly, for 1×8 devices (see below with reference to FIG. 9) a single multimode fiber may be used to inject light into the arranged input fibers, and eight (8) multimode fibers may be used to transmit between the individual output fibers in eight output fiber arrays and eight detectors. The choice between output bundles and output arrays is typically a trade-off between the cost of large detectors and that of additional fiber positioning means.

In the final absolute insertion loss measurement, single mode connecting fiber is used for single mode device pigtails, along with a fiber cutback procedure. The mass pigtails of the present invention facilitate mass cleaving in this cutback procedure.

Figure 8:
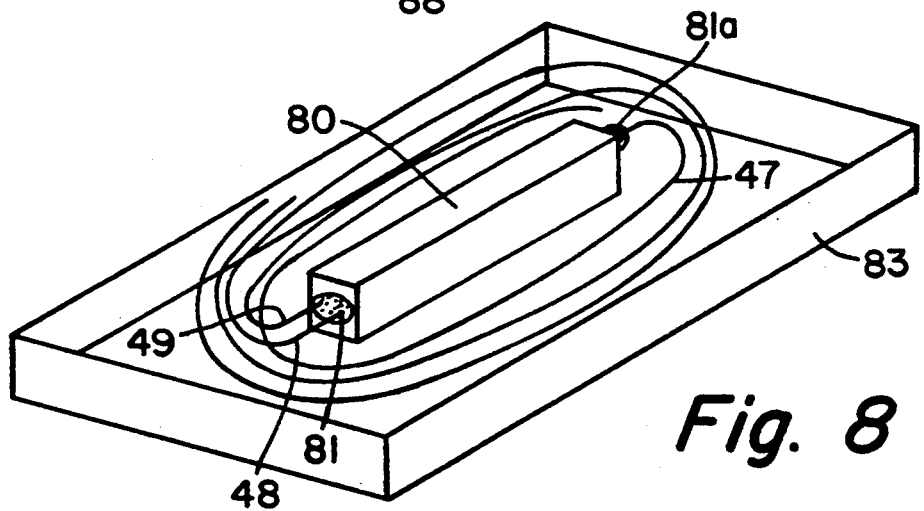
FIG. 8 is a perspective view of a single fully packaged 1×2 optical component, boxed for shipment.

In this manner, the present invention eliminates the necessity for separately connecting the individual fibers of each component to suitable measurement or testing apparatus. After all packaging and testing is completed, the individual components may be separated by cleaving or otherwise removing the fibers from the array means 87 and bundling means 88 and 89. The individual components may then be packaged in individual boxes as shown in FIG. 8.

Figure 9:
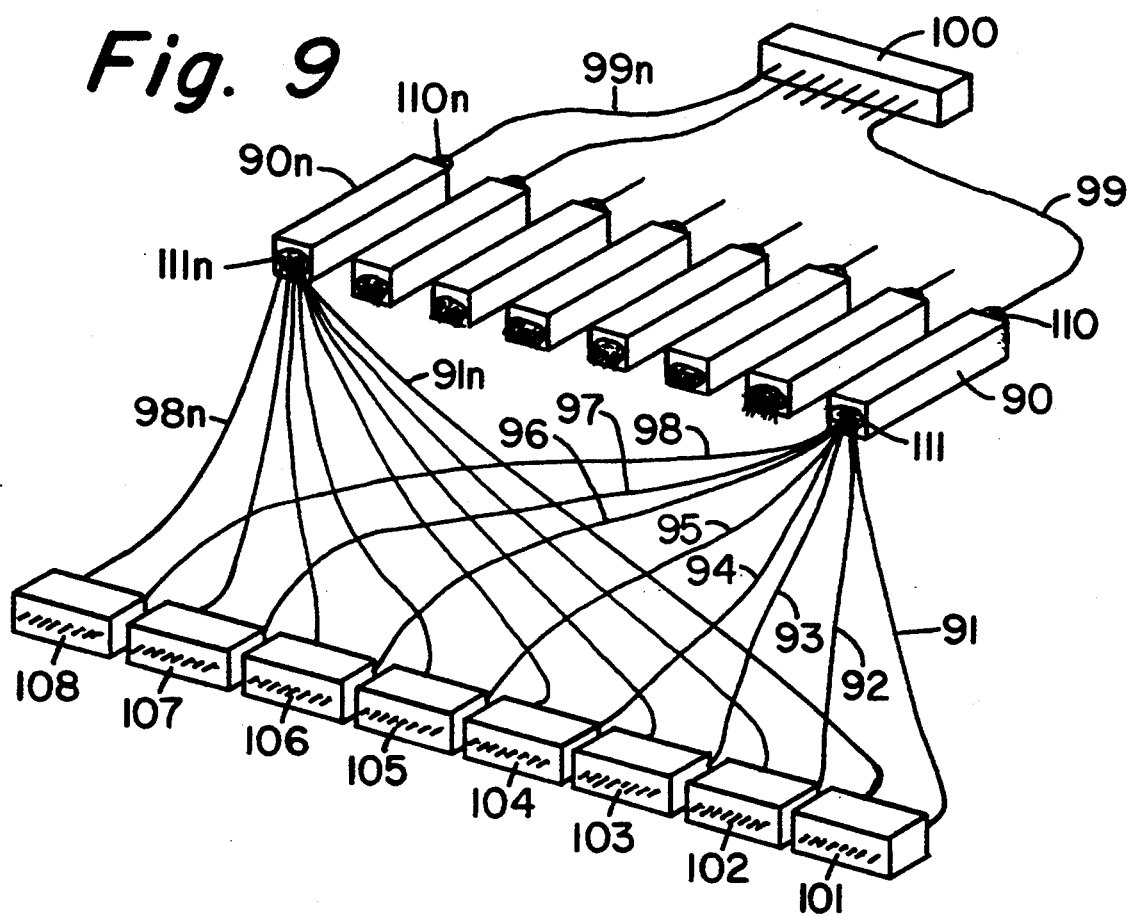
FIG. 9 is a perspective view of a plurality of packaged 1×8 optical components ready for thermal and/or optical testing.

FIG. 9 depicts a similar mass fiber assembly for a plurality of 1×8 waveguide splitter/combiner components 90–90n. Such 1×8 devices may be formed by lithographic techniques similar to those described above for 1×2 devices (see e.g. Bellerby etal., "low cost silica-On-Silicon SM 1:16 Optical Power Splitter for 1550 nm" E-FOC LAN '90, IGI Europe Jun. 27-29, 1990 pp. 100-103. In the embodiment depicted, array means 100 for input fibers 99–99n (extending from the component through fiber boot means 110–110n) is substantially the same as array means 87 in FIG. 6. Each device has eight output fibers, e.g., 91–98 (extending from the component through fiber boot means 111–111n), and therefore eight fiber bundling means 101–108 are used to form eight fiber bundles, each bundle comprising one particular output leg (1–8) from all the components. During the pigtailing process, the fibers from the eight bundles may be interleaved as described above with respect to fiber bundling means 88 and 89 for the 1×2 components. The eight sets of fibers are positioned in ribbons staged one above another, each ribbon laterally offset from the ribbon below it. Interleaving results when the ribbons are merged.

Measurement, characterization and testing of the set of 1×8 components are carried out in a manner similar to that described above with respect to FIG. 7 for the 1×2 components. In one embodiment, light is precisely injected into a particular input fiber, e.g., 99, and the outputs of the eight output fibers, e.g., 91–98, are detected by detectors arranged in front of the fiber endfaces grouped together by fiber bundling means 101–108. The process is repeated for each component by stepping the light input across the input fiber endfaces fixed in position by array means 100.

Figure 10:
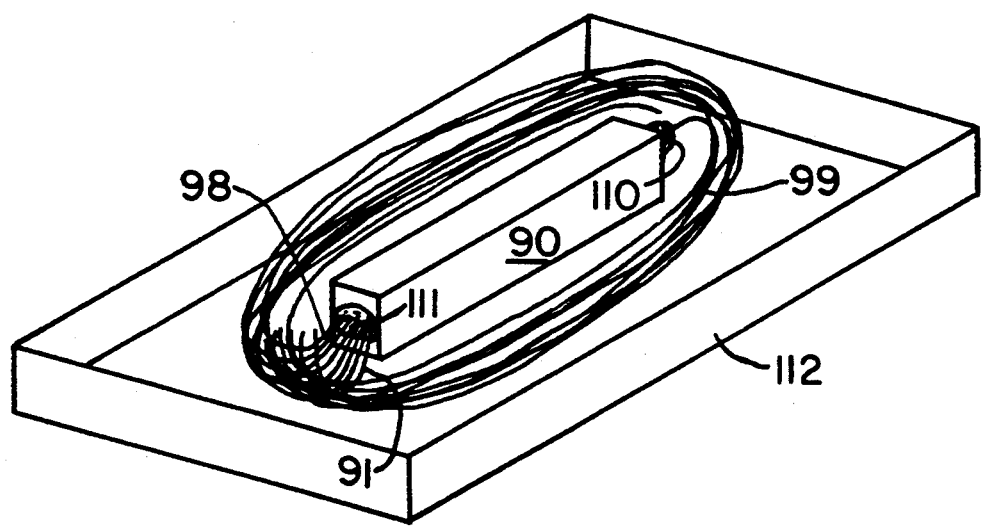
FIG. 10 is a perspective view of a single fully packaged 1×8 optical component, boxed for shipment.

FIG. 10 depicts an individual 1×8 component 90 boxed for shipment, with input fiber 99 (extending from the component through fiber boot means 110), and output fibers 91–98 (extending from the component through fiber boot means 111), arranged within box 112 in looped fashion.

In one example of the present invention, a squared off wafer with 33 1×2 multi mode splitters was pigtailed prior to separation of the components. Loose tube jacketing means were included. Clamp bars were used to hold the multiple pigtails in two ribbons, one with 33 jacketed fibers and the other with 66 jacketed fibers. The ends of the 33 input and 66 output fibers opposite the wafer were secured in an array means so that the 99 fibers were arrayed with their ends parallel. The wafer was 33 mm wide, 34 mm long, and 3 mm thick. The individual components were roughly 0.7 mm wide, with a pre-dicing saw cut roughly 0.3 mm wide. The splitters were measured after pigtailing while still integrally connected, and they all showed an excess intrinsic loss of <1 dB.

It is to be understood that the invention is not limited to the exact details of construction, operation, materials or embodiments shown and described, as modifications and equivalents will be apparent to one skilled in the art without departing from the scope of the invention. For example, the invention is not limited to combiner/splitters, but may be applied to the manufacture of any integrated optical component which has optical fiber pigtails. The invention may be applied to wafers with a plurality of MxN integrated optical components in general, utilizing M inputs and N outputs, for example 2×16 devices or M×N proximity coupler devices. It is advantageous to manufacture these M×N devices using M input ribbons and N output ribbons comprising one fiber for attachment to a particular output port of each of the plurality of integrated optical components. The ends of said ribbons opposite said components may be arrayed or bundled to facilitate active alignment or testing.

In addition, the mass processing aspects of the present invention may be applied to the mass pigtailing stage and/or mass packaging and/or mass measurement. Accordingly, the invention is to be limited only by the scope of the appended claims.

I claim:

1. A method of manufacturing integrated optical components having optical fibers attached to optical output ports, each of said fibers having first and second end surfaces, comprising:
    a) combining a plurality of optical fibers into at least one ribbon structure having first and second ends;
    b) maintaining said first end surfaces of said fibers at said first end of said at least one ribbon in a fixed relation to each other, the second end surface of any fiber at said second end of said at least one ribbon being movable with respect to the end surfaces of any other of said fibers;
    c) actively aligning said second fiber end surfaces at the second end of said at least one ribbon with waveguide output ports of a plurality of integrated optical components, while maintaining said first fiber end surfaces at said first end of said at least one ribbon in a fixed relation to each other to facilitate injection and detection of light signals during said active alignment, the alignment of any one of said second fiber end surfaces being performed independently of the alignment of the remaining of said second fiber end surfaces, and
    d) attaching each of the fibers at the second end of said at least one ribbon structure to that one of said waveguide output ports to which it had be end aligned.

2. The manufacturing method of claim 1, further comprising the step of:
    testing said plurality of integrated optical components, while maintaining said fiber end surfaces at said first end of said at least one ribbon in a fixed relation to each other to facilitate injection and detection of light signals during said active testing.

3. The manufacturing method of claim 1, wherein the fiber end surfaces at said second end of said at least one ribbon are arrayed together prior to said active aligning step, and further comprising
    actively aligning one of said second fiber end surfaces with one of said waveguide output ports,
    storing the position of said one of said waveguide output ports,
    using said stored position and the known distance between adjacent ones of said waveguide output ports, approximately aligning another one of said second fiber end surfaces with another one of said waveguide output ports, and thereafter,
    actively aligning said another one of said second fiber end surfaces with said another one of said waveguide output ports.

4. A method of manufacturing integrated optical components having optical fibers attached to optical output ports comprising:
    combining a plurality of optical fibers into at least one ribbon structure having first and second ends, each of said fibers having first and second end surfaces;
    maintaining said first end surfaces of said fibers at said first end of said at least one ribbon in a fixed relation to each other;
    actively aligning said second fiber end surfaces at the second end of said at least one ribbon with waveguide output ports of a plurality of integrated optical components, while maintaining said first fiber end surfaces at said first end of said at least one ribbon in a fixed relation to each other to facilitate injection and detection of light signals during said active alignment, and
    attaching each of the fibers at the second end of said at least one ribbon structure to that one of said waveguide output ports to which it had been aligned,
    wherein said plurality of integrated optical components comprise M×N combiner/splitters having M inputs and N outputs, and wherein M input ribbons and/or N output ribbons are used during said active alignment step, each ribbon comprising one fiber for attachment to a particular output port of each of said plurality of integrated optical components.

5. The manufacturing method of claim 4, wherein the ends of said ribbons opposite said components are arrayed or bundled.

* * * * *